United States Patent Office 2,776,995
Patented Jan. 8, 1957

2,776,995

α-UNSATURATED β-THIOETHER ALDEHYDES AND THEIR PREPARATION

Theodore L. Cairns, Newark, and John C. Sauer, Wilmington, Del., assignors to E. I. du Pont de Nemours & Company, Wilmington, Del., a corporation of Delaware No Drawing. Application April 22, 1954,
Serial No. 425,034

19 Claims. (Cl. 260—598)

This invention relates to novel unsaturated aldehydes containing thioether groups.

Aldehydes are useful as intermediates in synthesis of a great variety of chemical compounds. Presence of one or more additional functional groups permits preparation of desirable derivatives having properties modified by the additional groups. A class of aldehydes particularly desirable for use as intermediates is made up of ethylenically unsaturated compounds each having a thioether substituent.

A primary object of the present invention is production of a novel class of thioether-substituted unsaturated aldehydes. Another object is provision of processes effective in preparation of these aldehydes. Other objects will be apparent from the following detailed description of the invention.

The above and other objects of this invention are accomplished by provision of unsaturated aldehydes having an ethylenic linkage in the alpha (number two) position and a thioether substituent in the beta (number three) position. In general, this is brought about by combining an alkyne, a mercaptan, and carbon monoxide. The reaction may be conducted conveniently in a valved reaction vessel capable of withstanding high pressure. After being swept out with an inert gas the vessel is charged with an amount of mercaptan and a small amount of catalyst, then is closed, cooled, and evacuated to a pressure equivalent to a few millimeters of mercury. An equimolar or greater amount of alkyne is introduced, and the vessel then receives an amount of carbon monoxide sufficient to produce the desired superatmospheric pressure at reaction temperature. The contents are mixed thoroughly by agitation of the vessel and are heated to a suitable operating temperature, at which the catalyst liberates free radicals. Carbon monoxide is introduced to maintain the pressure at the desired value in the reactor until the reaction ends, as evidenced by no further decrease in pressure, after which the vessel is allowed to cool to room temperature. The liquid reaction product is removed after venting of the excess pressure, and conventional methods of purification are used in isolating the thioether of unsaturated aldehyde from the product.

Although the relative amounts of reactants are not particularly critical, best yields accompany use of 50% to 100% (molar) excess of alkyne over mercaptan. In particular, this excess minimizes formation of dithioethers. High concentrations of carbon monoxide, which are obtained at increased pressure, also benefit the yield. While any superatmospheric pressure may be used, yields obtained below about 100 atmospheres are too low for practical operation. Pressures of carbon monoxide from 1000 atmospheres to upwards of 5000 atmospheres are highly satisfactory, while pressures of 20,000 atmospheres or more may be used subject to limitations of the equipment. The reaction can be carried out over a wide range of operating temperatures, as from about room temperature (20° to 30° C.) to about 200° C., the preferred temperature being one at which the catalyst being used liberates free radicals readily. With customary azo and peroxy catalysts, the operating range of temperature preferred for this reason is from about 50° C. to about 150° C. The reaction will proceed satisfactorily over a wide range of catalyst concentration, as from about 0.01% to about 15% or more, based upon the total weights of the reactants; concentrations of catalyst in the lower part of this range usually prove completely satisfactory. No inert diluent or solvent is necessary, but almost any substance that is inert under the reaction conditions may be present; for example, hydrocarbons, such as benzene and hexane, and inert gases, such as argon and nitrogen, are innocuous.

The invention is exemplified below by detailed accounts of preparation of particular unsaturated aldehydes having thioether substituents. Parts are given by weight.

EXAMPLE I

A reaction vessel capable of withstanding high pressure is swept out with oxygen-free nitrogen and then is charged with 90 parts of n-butyl mercaptan and 2 parts of 1,1' - azodicyclohexanecarbonitrile. The reactor is closed, pressure-tested, and cooled to about −78° C. in a mixture of methanol and solid carbon dioxide. The reactor is then carefully evacuated to about 2 to 5 mm. (mercury) pressure, and 26 parts of acetylene are introduced. This is done by allowing acetylene from a previously calibrated reservoir to flow into the reactor until the pressure drop in the reservoir indicates that the desired quantity of acetylene has been removed. The reaction vessel is then connected to a source of carbon monoxide at a pressure of 1000 atmospheres. The vessel is agitated and heated to a temperature of 100° to 104° C. while carbon monoxide is introduced intermittently to maintain a pressure of 800 to 920 atmospheres during a total reaction period of 15.5 hours. The reaction vessel then is cooled to room temperature, and the pressure bled down to atmospheric pressure. The reaction product is combined with the reaction products obtained in two similar runs. The composite reaction product is distilled in an efficient fractionating column, yielding 22 parts of clear 3-(n-butylthio)propenal boiling at 72–76° C./2 mm. and having a refractive index, $n_D^{25}$, of 1.5451, and 10.5 parts of less pure product boiling at 66–76° C./2 mm. and having a refractive index, $n_D^{25}$, of 1.5283. The infra-red and ultra-violet absorption spectra of the product are consistent with this structure. This n-butylthiopropenal forms a 2,4-dinitrophenylhydrazone melting at 114° C. Analytical data characterizing 3-(n-butylthio)propenal and its 2,4-dinitrophenylhydrazone are summarized as follows:

For the aldehyde—

|  | Carbon | Hydrogen | Sulfur | Mol. Wt. | Carbonyl | Density |
|---|---|---|---|---|---|---|
|  | Percent | Percent | Percent |  | Percent |  |
| Calc'd | 58.5 | 8.3 | 23.0 | 144 | 19.5 | |
| Found | 58.3 | 8.3 | 22.3 | 148 | 19.58 | 0.9987 |

For the 2,4-dinitrophenylhydrazone—

|  | Carbon | Hydrogen | Nitrogen | Sulfur |
|---|---|---|---|---|
|  | Percent | Percent | Percent | Percent |
| Calc'd | 48.1 | 4.9 | 17.3 | 9.9 |
| Found | 48.1 | 4.9 | 16.9 | 9.8 |

Proceeding as in the above example, 3-(n-butylthio)-propenal was obtained in runs summarized in the following table, using the indicated amounts of the same components and the temperatures, pressures, and times shown. Yield of the product was based upon the amount of starting mercaptan, and the boiling temperature was measured at the pressure indicated (mm. of mercury). The catalyst in run A was ditert-butyl peroxide and in runs B and C was 1,1'-azodicyclohexanecarbonitrile.

Table

|  | Run A | Run B | Run C |
|---|---|---|---|
| Parts (by weight): |  |  |  |
| n-butylmercaptan | 12 | 60 | 90. |
| acetylene | 5 | 26 | 26. |
| catalyst | 0.3 | 2.0 | 2.0. |
| Pressure of CO (atmos.) | 2,450–2,950 | 960–1,000 | 900–960. |
| Reaction temperature (C.) | 122°–125° | 110° | 102°–105°. |
| Time (hours) | 2.8 | 14.5 | 15. |
| Yield (percent) | 17 | 5.4 |  |
| Refractive index ($n_D^{25}$) |  | 1.5444 | 1.5131. |
| Boiling temperature (C.) | 120°/19 mm | 98°/3 mm | 97°–120°/5 mm. |

Preparation of products of this invention other than 3-(n-butylthio)propenal is detailed in the following examples.

EXAMPLE II

A reaction vessel of the type described in Example I is charged with 124 parts of benzyl mercaptan, 2.5 parts of 1,1'-azodicyclohexanecarbonitrile and 26 parts of acetylene by the procedure described in that example. The reaction is carried out at a pressure of 960 to 1000 atmospheres of carbon monoxide and at 98–100° C. for a period of 16.7 hours. The reaction products from this run and from two analogous runs are combined and subjected to fractional distillation. From the composite sample of the three runs are obtained 9.4 parts of crude 3-(benzylthio)propenal, boiling point 107–112° C./1.3 mm.; $n_D^{25}$, 1.6167. The infrared analysis of this product clearly demonstrates the beta-thiopropenal structure. This benzylthio-propenal forms a brown 2,4-dinitrophenylhydrazone which melts at 157–160° C. after recrystallization from acetone. Results of analysis of the 2,4-dinitrophenylhydrazone of 3-(benzylthio)propenal ($C_{16}H_{14}O_4N_4S$) follow.

Calc'd ____ C, 53.6 %; H, 3.9 %; N, 15.6 %; S, 8.95%
Found ____ C, 52.81%; H, 3.96%; N, 15.18%; S, 8.98%

EXAMPLE III

Using the procedure of the previous examples, 55 parts of thiophenol, 1 part of 1,1'-azodicyclohexanecarbonitrile and 26 parts of acetylene are reacted under 920–960 atmospheres of carbon monoxide at 100° C. for 16 hours. The product of this run is combined with that of a duplicate run and the composite sample is subjected to fractional distillation. There is obtained 7 parts of crude 3-(phenylthio)propenal, which corresponds to a 6.2% yield. On redistillation there is obtained a fraction boiling mainly at 157° C./18 mm.; $n_D^{25}$, 1.6201. Infrared analysis confirms the thiopropenal structure. This phenylthiopropenal forms a 2,4-dinitrophenylhydrazone which is a chocolate-brown solid melting at 190–194° C. after recrystallization from toluene. Analysis of the 2,4-dinitrophenylhydrazone of 3-(phenylthio)propenal ($C_{15}H_{12}O_4N_4S$)

follows.

Calc'd _____ C, 52.4 %; H, 3.5 %; N, 16.2 %
Found _____ C, 52.31%; H, 3.91%; N, 15.79%

EXAMPLE IV

A reaction vessel of the type used in the preceding examples is charged with 48 parts of methyl mercaptan, 2 parts of 1,1'-azodicyclohexanecarbonitrile, and 26 parts of acetylene. The reaction is carried out by the procedure described in the preceding examples under a carbon monoxide pressure of 890–990 atmospheres at 100° C. during a period of 15 hours. The product obtained after cooling to room temperature is combined with the product from a duplicate run and the composite sample subjected to fractional distillation, yielding 41.8 parts of a product boiling at 110–118° C./92 mm. This product, on the basis of sulfur analysis, is a mixture of 3-(methylthio)propenal and 1,2-di(methylthio)ethane.

Analysis                                               Percent
  Calculated for methylthiopropenal
    ($C_4H_6OS$) _____ S, 31.4
  Calc'd. for 1,2-di(methylthio)ethane
    ($C_4H_{10}S_2$) _____ S, 52.4
  Found _____ S, 48.6

According to this sulfur analysis, this product contains 8.4 parts of 3-(methylthio)propenal, corresponding to a 4.1% yield. Infrared absorption spectra of the product confirms the presence of the beta-thiopropenal structure. This methylthiopropenal readily forms a reddish brown 2,4-dinitrophenylhydrazone which melts at 188–191° C. after recrystallization from alcohol. Analysis of this substance ($C_{10}H_{10}N_4SO_4$) follows.

Calc'd _____ C, 42.6%; H, 3.6%; N, 19.8%
Found _____ C, 42.6%; H, 3.8%; N, 19.5%

EXAMPLE V

Using the procedure of the preceding examples, the reaction vessel is charged with 52 parts of n-butylmercaptan, 51 parts of phenylacetylene, and 2 parts of 1,1'-azodicyclohexanecarbonitrile. The reaction is carried out under a carbon monoxide pressure of 800–960 atm. at a temperature of 98–110° C. for a period of 16.6 hours. The reaction product is given a rough preliminary distillation and then fractionated in an efficient fractionating column, giving 9 parts of a distillate boiling at 140–167° C./2 mm., which is believed to be 3-(n-butylthio)-2-phenylpropenal. The infrared absorption spectrum of the product shows the presence of aldehydic carbonyl. This product forms a red 2,4-dinitrophenylhydrazone of melting point 147–8° C., which analyses for nitrogen as follows.

Calc'd. (for $C_{19}H_{20}SN_4O_4$): 14.0%. Found: 13.94%.

Other mercaptans that can be substituted satisfactorily for those of the examples in the practice of this invention are of formula RSH where R is any monovalent hydrocarbon group or chlorohydrocarbon group or hydroxyhydrocarbon group. Thus, the mercaptan may be any compound of that formula where R is alkyl, as exemplified by ethyl, octyl, dodecyl, and octadecyl; aryl, e. g. tolyl; cycloalkyl, e. g. cyclohexyl; or aralkyl, e. g. phenylethyl. Especially where R is chlorinated hydrocarbon, e. g. parachlorophenyl, or hydroxylated hydrocarbon, e. g. 4-hydroxybutyl, the mercaptan may be symbolized otherwise for convenience, as XR'''SH, for example, where X is a chloro or hydroxyl substituent on the divalent hydrocarbon radical R'''; however, X in such case has no more significance in the reaction herein described than when it is a simple hydrogen substituent, whereupon the formula of the mercaptan is reducible to RSH, as before. Alkynes that can replace those of the examples are of formula R'C≡CR'' where R' and R'' (which may be alike) are either hydrogen or monovalent hydrocarbon radicals free of aliphatic unsaturation, such as methylacetylene, butylacetylene, dimethylacetylene, ethylmethylacetylene, methyl-n-propylacetylene, and methylphenylacetylene. Many other suitable mercaptans and alkynes will come readily to mind.

Of course, use of various combinations of alkyne and mercaptan in the practice of this invention will give many different products in addition to those mentioned above. Some of these are 3-(ethylthio)-2-methylpropenal, 3-(octylthio)-2-ethylpropenal, 3-(n-octadecylthio)propenal, 3-(phenylthio)-2-phenylpropenal, 3-(cyclohexylthio)propenal, 3-(o-tolylthio)propenal, 3-(p-chlorophenylthio)propenal, 3-(4-hydroxybutylthio)-2-methylpropenal, 2,3-dimethyl-3-(methylthio)propenal, and 3-(n-butylthio)-3-methyl-2-n-propylpropenal.

Catalysts useful in the practice of this invention are those capable of yielding free radicals under the reaction conditions. In general, they are substances effective to initiate addition polymerization of vinyl compounds. Especially suitable is the azo type of catalyst, as described in Patent 2,471,959. Illustrative of these azo catalysts are alpha, alpha'-azobis (alpha, gamma-dimethylvaleronitrile); dimethyl alpha, alpha'-azodiisobutyrate; alpha, alpha'-azodiisobutyramide; and alpha-(carbamylazo)isobutyronitrile. Another kind of catalyst particularly effective is the well-known peroxy type, which includes peroxides, peroxy salts, and percarboxylates, among others. Specific examples of these peroxy catalysts are benzoyl peroxide, diethyl peroxide, tert-butyl pentamethyl peroxide, ditert-butyl peroxide, sodium persulfate, ammonium persulfate, tert-butyl hydroperoxide, ethyl hydroperoxide, and peracetic acid. Other catalysts that are capable of liberating free radicals and that can be used include the azines, oximes, and amine oxides, e. g., benzalazine, diphenylketazine, acetoxime, and trimethylamine oxide. Occasionally combinations of two or more catalysts are useful.

The products of this invention are useful for a variety of purposes. They are especially useful as chemical intermediates. Specific examples of such uses include the following: the hydrolysis of 3-alkylthiopropenals to malonic aldehyde, OHCCH₂CHO, which is difficult to prepare by other methods; and reduction of 3-methylthiopropenal to the saturated 3-methylthiopropanal, which in turn can be converted to methionine by reaction with hydrogen cyanide and ammonia. The products of this invention are useful also for copolymerization with olefinically unsaturated compounds capable of undergoing addition polymerization. For example, 3-(n-butylthio)propenal can be copolymerized with acrylonitrile to give a useful fiber-forming polymer.

What is claimed:
1. Compound of formula

RSC=CCHO in which the only aliphatic carbon-to-carbon unsaturation is indicated by the double bond, R is a monovalent hydrocarbon radical with its free valence stemming from saturated carbon, and R' and R" are from the class consisting of monovalent hydrocarbon radicals and hydrogen.
2. Compound of claim 1 in which R' is hydrogen.
3. Compound of claim 1 in which R" is hydrogen.
4. 3-(alkylthio)propenal.
5. 3-(n-butylthio)propenal.
6. 3-aralkylthio)propenal.
7. 3-(benzylthio)propenal.
8. 3-(cycloalkylthio)propenal.
9. 3-(n-butylthio)-2-phenylpropenal.
10. Process comprising reacting carbon monoxide, an alkyne, and a mercaptan by bringing the same in contact at a pressure of at least 100 atmospheres and a temperature from room temperature to 200° C. with a catalyst liberating free radicals under the reaction conditions and isolating therefrom a compound of formula

XR'''SC=CCHO in which the only aliphatic carbon-to-carbon unsaturation is indicated by the double bond, R' and R" are from the class consisting of monovalent hydrocarbon radicals and hydrogen, R''' is a divalent hydrocarbon radical, and X is from the class consisting of hydrogen, chlorine, and hydroxyl radicals.

11. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, phenylacetylene and carbon monoxide with n-butyl mercaptan.

12. Process for aldehyde production comprising combining, at superatmospheric pressure of at least 100 atmospheres, at a temperature from room temperature to 200° C., and in contact with a catalyst liberating free radicals under the reaction conditions, carbon monoxide, an alkyne free of aliphatic unsaturation except for the sole acetylenic bond, and a mercaptan of formula RSH where R is a monovalent hydrocarbon radical free of aliphatic unsaturation.

13. The process of claim 12 in which the reaction is carried out at a temperature within the range of about 50° C. to 150° C. and the catalyst is from the class consisting of azo and peroxy catalysts.

14. Process comprising reacting carbon monoxide, acetylene, and n-butyl mercaptan at a pressure of about 1000 atmospheres and a temperature within the range of about 50° C. to 150° C. in the presence of a catalyst that liberates free radicals under the reaction conditions and isolating 3-(n-butylthio)propenal therefrom.

15. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, acetylene and carbon monoxide with a mercaptan RSH wherein R is alkyl.

16. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, acetylene and carbon monoxide with a mercaptan RSH wherein R is aryl.

17. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, acetylene and carbon monoxide with thiophenol.

18. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, acetylene and carbon monoxide with a mercaptan RSH wherein R is aralkyl.

19. The process for the preparation of a thioether aldehyde which comprises reacting, in the presence of a free radical producing catalyst, at a pressure of at least 100 atmospheres, and a temperature, within the range from 20–200° C., at which the catalyst readily liberates free radicals, acetylene and carbon monoxide with benzyl mercaptan.

References Cited in the file of this patent

Reppe Acetylene Chemistry (Charles A. Meyer & Co., Inc. Translation), New York, 1949 (pages 152 and 159–161).